Figures 1, 2, 3, 4:
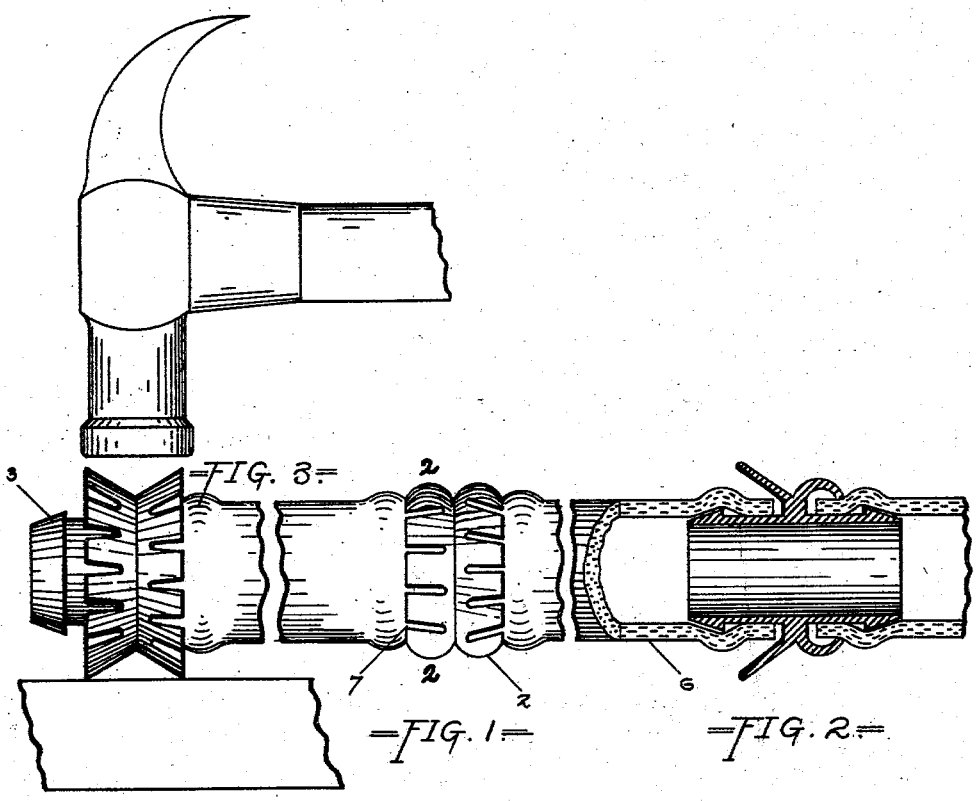

No. 758,099. PATENTED APR. 26, 1904.
F. H. PARADICE.
HOSE CONNECTION.
APPLICATION FILED FEB. 3, 1903.
NO MODEL.

WITNESSES: Frank H. Paradice
INVENTOR.

No. 758,099. Patented April 26, 1904.

UNITED STATES PATENT OFFICE.

FRANK H. PARADICE, OF DENVER, COLORADO.

HOSE CONNECTION.

SPECIFICATION forming part of Letters Patent No. 758,099, dated April 26, 1904.

Application filed February 3, 1903. Serial No. 141,773. (No model.)

*To all whom it may concern:*

Be it known that I, FRANK H. PARADICE, a citizen of the United States, residing at Denver, in the county of Denver and State of Colorado, have invented a new and useful Hose Connection, of which the following is a specification.

My invention relates to hose connections or menders used to connect two sections of hose together, generally to connect hose that has had a defective piece cut out, but is also useful to join two or more sections of unused hose.

Hose-menders have been heretofore made of an inner tube of metal or wood, the hose fastened thereto by bands of wire or rings of metal clamped on in different ways. Among the defects of these styles of repair-couplings are insufficient grip or tenacity, excepting when fastened by use of special tools not generally available at dwellings, where garden-hose is chiefly used, the catching (whether of wire or those fastened with screws) on sidewalks or other obstacles, due to the uneven or unsuitable exterior form of the clamps. These objections have been overcome to some extent by a hose-mender made of metal, whereby the hose is clenched onto the inner tube of mender by hammering down the slotted edges of the outer tube. My invention has particular reference to the last-mentioned form of mender and is an improvement of same. This form of mender as heretofore made has an inner tube, usually with a straight bore. The outside of the ends of the inner tube which receive the hose are tapering in form, being larger in diameter toward the center of mender, and the slotted outer edges are either parallel with the inside of the inner tube or they are slightly depressed or tapering (*i. e.*, decreasing the diameter) from the center of tube toward the ends of mender. Now it is found that the hose has a tendency to slip off spigot end of mender when the slotted ends are being hammered down, and it is difficult to hold the hose in place on a flat surface while clenching the mender. My invention overcomes these objections, and by its use the mender can be hammered down while the hose and mender are lying in parallel line with floor, sidewalk, bench, or other object which is used to hammer the hose-mender down on; also, by its use one blow of the hammer, used with its face parallel with the mender, will clench part of both sides of the mender. The form of the inner tube is such that the hose is held firmly in place without any possibility of its slipping off while the mender is being clenched, as is shown on the accompanying drawings and explained in this specification.

My invention is also useful as a hose band or strap.

Figure 1 shows the hose-mender as it appears when fastened by hammering down the points or fingers. Fig. 2 is a cross-section of mender with fingers hammered down on one end of mender, and on the other end the fingers are shown as they are before they are clenched. Fig. 3 is a view of mender before it is hammered down on hose, one end with hose on it and the other showing the spigot end of hose-mender. A hammer-head is shown above Fig. 3 and a slab of stone below. The face of hammer and top of stone are parallel, indicating the facility with which the mender may be fastened to the hose. Fig. 4 is a cross-section of mender at 2 2, Fig. 1.

Like figures refer to like parts in the several views.

6 represents the hose; 2, the fingers or points; 3, the the inner tube with spigot end; 7, the slots in outer shell of mender.

The manner in which this mender is attached is as follows: The end of the tube is forced into the hose, the spigot causing the hose to expand and as it passes the spigot to contract, as shown at Fig. 2. The other end is then forced into the other section of hose which is to be joined. Then the points of the mender are hammered down, as indicated at Fig. 3. When hammered down, the mender assumes the form as shown at Fig. 1.

Having described my invention and its use, what I claim as new, and for which I desire Letters Patent, is—

A hose-joiner complete in one article consisting of an inner tube with enlarged spigot ends for insertion into hose to be joined, and an outer portion or shell which will surround the hose to be joined; the edges of said portion forming circles which are greater in diameter than any other part of the joiner and set at an angle relative to the longitudinal side of the inner tube of from one to ninety degrees and being slotted, substantially as set forth.

In testimony whereof I affix my signature in presence of two witnesses.

FRANK H. PARADICE.

Witnesses:
JAMES E. HUSK,
FRANK M. HAVENS.